United States Patent [19]

Rush

[11] 4,163,837
[45] Aug. 7, 1979

[54] MULTIPLE LOCI COUNTER-CURRENT WASHING

[75] Inventor: Elton E. Rush, Bartlesville, Okla.

[73] Assignee: Phillips Petroleum Company, Bartlesville, Okla.

[21] Appl. No.: 852,140

[22] Filed: Nov. 16, 1977

[51] Int. Cl.$^2$ .............................................. C08F 6/00
[52] U.S. Cl. .................................. 528/498; 23/293 R; 528/496
[58] Field of Search .............. 528/498, 496; 23/293 R

[56] References Cited

U.S. PATENT DOCUMENTS

| | | | |
|---|---|---|---|
| 3,262,922 | 7/1966 | Payne | 260/93.7 |
| 3,280,090 | 10/1966 | Scoggin | 260/93.7 |
| 3,347,637 | 10/1967 | Price et al. | 23/270 |
| 3,467,576 | 9/1969 | Clark | 162/237 |
| 3,679,371 | 7/1972 | Tisdel et al. | 23/295 |
| 3,762,880 | 10/1973 | Tisdel et al. | 23/273 R |

*Primary Examiner*—Stanford M. Levin

[57] ABSTRACT

The removal of undesired constituents or impurities from solids, preferably introduced and removed as a slurry, is effected by counter-current flow of the solids and a washing agent introduced into a washing zone where at least a portion of the washing agent is introduced at a point intermediate the introduction of the solids or slurry and the point of introduction to the zone of the initial washing agent. By controlling the temperature of the washing agent, the plural introduction creates a plurality of temperature interfaces within the washing zone, thus increasing efficiency by, in effect, increasing the number of washing or extraction stages present in the zone. In one embodiment a slurry of polyolefin or polymer, e.g. polypropylene, is washed with a solvent, e.g., substantially pure propylene liquid.

8 Claims, 3 Drawing Figures

MULTIPLE LOCI COUNTER-CURRENT WASHING

This invention relates to the removal of undesired constituents or impurities from solids. In one of its aspects, the invention relates to counter-current flow washing of impurities or undesired constituents from solids containing them. In a more specific aspect of the invention, it relates to the creation of a multi-stage, multi-temperature, extraction operation.

In one of its concepts, the invention provides a method for the removal of impurities or undesired constituents from solids containing them by passing said solids preferably in the form of a slurry into one end of a treating zone while passing washing or treating fluid into the other end of said zone, at the same time, passing at least one portion of treating agent into at least one point intermediate the said ends of said zone, thus to create at least three extraction stages in the zone. In another of its concepts the invention, in its now-preferred form, is operated in a substantially vertical extraction or washing zone or column and the solids are of a density greater than that of the liquid. The treating agent or washing liquid is introduced as at least two separate streams, at least two different temperatures to at least two different points at different levels of the column below the introduction of the heavier solids or slurry of solids into the column; in this preferred application of the invention the temperature of the lowest introduced stream being lower than the next stream, etc. In a further concept of the invention, as embodied in a now-preferred form, a slurry of polyolefin, e.g., polypropylene, which may have been previously treated with chelating agent, is introduced into the upper part of a polymer wash column at a somewhat elevated temperature to remove traces of catalysts, say, titanium therefrom, wash propylene substantially free of catalyst components being introduced into two lower sections of the column at different levels, the temperature of the lower-introduced propylene being substantially below the the temperature of the slurry and the temperature of the remaining propylene stream being intermediate said temperatures. In another concept of the invention, it is viewed as creating additional stage or stages of washing or extraction arriving at so-called interfaces which delineate the stages owing to induced density differences, as more evident from the examples given herein.

In a still further concept of the invention, the introduced slurry of solids is of such nature that the washing agent or treating fluid is miscible therewith.

One skilled in the art in possession of this disclosure having studied the same will recognize that three or more stages of washing are obtained, as in a polypropylene wash column, by adding wash solvent, e.g., propylene, at two or more levels in the column, thereby establishing at least two zones of heat transfer in which a temperature difference of at least about 25° F. can be maintained, between adjacent zones.

The following patents are made of record and their disclosures are incorporated herein by reference, U.S. Pat. Nos. 3,262,922 issued July 26, 1966, William E. Payne; 3,272,789 issued Sept. 13, 1966, R. S. Joyner and L. E. Perrier; 3,280,090 issued Oct. 18, 1966, J. S. Scoggin; and 3,347,637 issued Oct. 17, 1967; J. S. Scoggin and L. T. Price.

The identified patents deal with washing processes and are believed helpful background for the better understanding of the invention set forth and claimed herein.

It is important in the production of products, e.g., polyolefins, for example, polypropylene, to remove as far as possible traces of catalyst, as well-known in the art.

The invention is now described in connection with a preferred embodiment of it in which polypropylene solids are substantially freed from catalyst components.

It is an object of this invention to provide an improved method for the separation of impurities or occluded materials from solids. It is another object of this invention to improve a known extraction method procedure. It is a further object of this invention to more efficiently remove entrained or occluded or dissolved solids or undesirable impurities from a solid product, e.g., a polyolefin, for example, from polypropylene. It is a still further object of the invention to provide effective washing of solids when high flow rates in the washing zone are desired.

Other aspects, concepts, objects and the several advantages of this invention are apparent from a study of this disclosure, the drawing and the appended claims.

According to the present invention, there are created in a washing zone at least three washing or extraction stages involving density differences by introducing a slurry into one end, of a treating zone, introducing, at a temperature different from that of the introduced slurry, a first portion of a washing agent into the other end of said zone, and introducing another portion of washing agent at a temperature intermediate that of the slurry and that of said first portion of washing agent to a locus intermediate the introduction of said slurry and said first portion of washing agent.

In an embodiment of the invention the treating zone is preferred to be substantially vertically disposed. The slurry, e.g., polypropylene in liquid propylene, is passed into the top portion of the treating zone. Liquid propylene wash is introduced to the bottom portion of the zone and is at a temperature lower than that of the slurry. To an intermediate portion of the zone, i.e., intermediate the introduction of the slurry and the liquid propylene wash, there is introduced additional liquid wash at a temperature which is between that of the slurry and the liquid propylene wash being introduced into the bottom of the treating zone.

In its preferred form the invention contemplates solids heavier than the solvent.

The liquid slurrying the solids must have the same or lower density as that of the solvent—else it will sink with the solids. In the just described embodiment the liquid slurrying the solids is the same as the washing agent.

When the invention is applied to the washing of solids which are buoyant in the wash liquid, the slurry feed is introduced at a point near the bottom of the column. The wash solvent is introduced near the top and at intermediate point(s) and should be at higher temperatures than the slurry in order to maintain the desired temperature and density gradient in the column.

The invention, accordingly, involves the concept that the solids' density is different from that of the slurrying liquid and washing agent.

This invention provides a more efficient method for washing a solid, e.g., a polymer slurry to remove undesired components therefrom, e.g., soluble polymer and- /or soluble catalyst components from a slurry of polyolefin. It is particularly suitable for use in processes for producing olefin polymers such as polypropylene.

The catalyst system used in preparing isotactic polypropylene generally comprises an alkylaluminum compound such as triethylaluminum and a metal halide such as titanium trichloride. Other metal salts and adjuvants may be incorporated into the catalyst system. Examples of such systems are set forth in U.S. Pat. No. 3,272,789, above-noted.

Before processing the polymer slurry in the washing zone, it is generally desirable to treat the slurry with chelating agents such as acetylacetone or propylene oxide or a combination of such agents to solubilize catalyst residues. This step is taught in the patent just noted.

It is known to provide an extraction or washing column in which the wash solvent is introduced into the lower part of the wash column at a lower temperature than that of a polymer feed slurry introduced into the upper part of the vessel. Polymer solids settle through the solvent and are removed as a settled sludge from the bottom of the vessel. Liquid containing soluble polymer and soluble catalyst residues is displaced out the top of the column. At low feed rates this method provides a theoretical infinite number of washing stages.

A sharp temperature gradient also is produced at said low feed rates with which a theoretical infinite number of stages is obtained. This is a heat transfer phenomenon. The location of the interface depends on the ratio of heat capacity of the wash as compared to the heat capacity of the solids (slurry), i.e., the wash ratio.

However, it is found that at higher feed rates laminar flows cannot be maintained in the wash section, and turbulent mixing occurs.

According to the present invention, however, regions of turbulent mixing are created and are separated by two or more temperature interfaces, and the density differences of the washing agent on both sides of each interface.

Solubles introduced into the upper section of the column along with the polymer are diluted by the rising wash solvent and for the most part, are displaced out the top of the column. Polymer with remaining occluded solubles passes downwardly through the temperature gradient interface and is further washed in a lower stage. Polymer is discharged as settled solids from the bottom of the column.

The invention, basically, increases the capacity or throughput of a wash column. It introduces the solvent at two or more levels in the column. Solvent introduced at the lower level is at a temperature below that of the slurry while the solvent introduced at a higher level is at higher temperature, but below the slurry feed temperature. By this procedure two or more interfaces with sharp temperature gradients can be created in the column, thereby providing three or more washing zones. Thus, it is contemplated that more than two solvent or wash introductions can be made. The following examples illustrate the merit of the invention.

BRIEF DESCRIPTION OF THE DRAWINGS

Referring now to the drawings,

Referring now to FIG. 1, the solids slurry containing solids to be purified is introduced to column 2 by feed conduit 3. Wash liquid or solvent is introduced by conduit 4 and an "interface" having a density gradient as well as a temperature gradient is formed at level 5. As shown, the interface has some height (thickness) and the temperature gradient is across the length of this height as is the density difference. The height (thickness) of the interface is determined by the velocity of settling of the largest particles, and the time required for them to transfer heat to the washing agent. The arrows in FIG. 1 show laminar flow. This is the condition which can prevail at low flow rates.

Purified solids slurry is removed at 6 while wash solvent containing impurities is taken off at 7.

Figure 2:
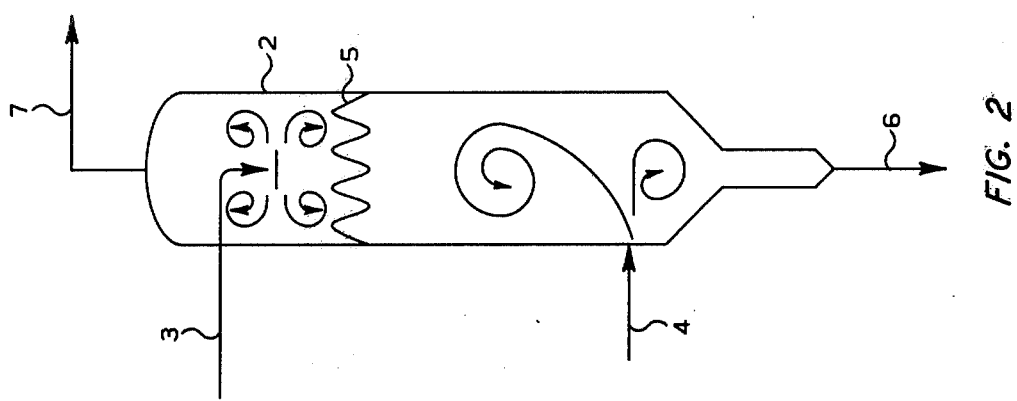
FIG. 2 shows the turbulence which occurs at high flow rates which result in one and two wash stages rather than an infinite number possible when laminar flow exists.
Figure 1:
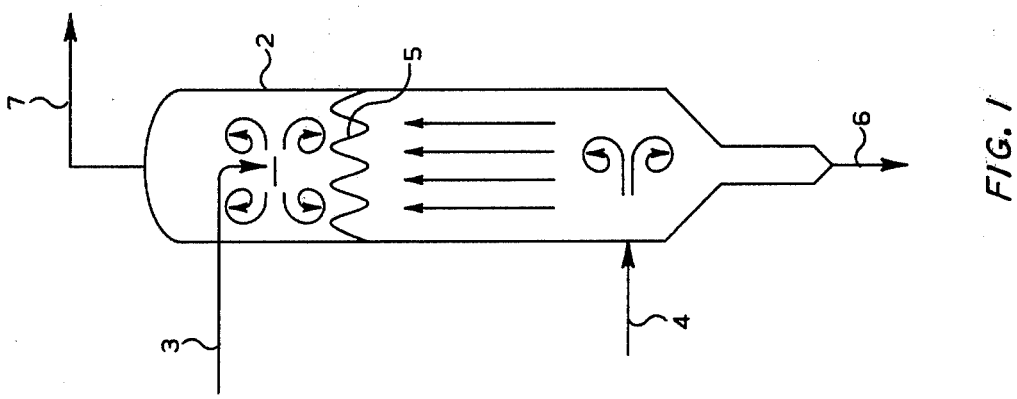
FIG. 1 shows a conventional two-stage wash column or operation.

FIG. 1 is representative of the flow pattern prevailing at low flow rates. Comparison of FIGS. 1 and 2 show, by the arrows, the difference in the flows in these figures. It is to be noted that FIG. 2, at high flow rates, will have turbulence virtually over all of the lower portion of the column. FIG. 2 is to be viewed further in the light of Example 1 given below.

Figure 3:
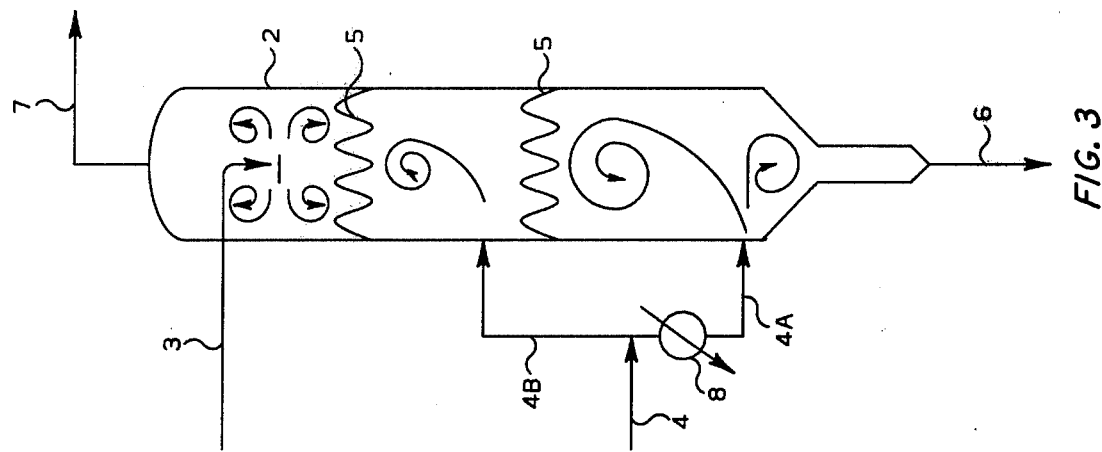
FIG. 3 shows a three-stage operation according to the invention, accomplished by plural introduction of the wash fluid or solvent.

Referring now to FIG. 3, stream 4, prior to its introduction is divided into substreams or portions 4a and 4b, which are separately introduced at different levels of the column, thus creating two "interfaces" or temperature and density gradients, dividing the column into what can be termed three stages which accomplish greater efficiency. A cooler 8 is provided to cool stream 4a to a temperature below that of stream 4b. The arrows show that three zones of turbulence are created.

FIG. 3 of the drawing is to be viewed further in connection with Example 2 given below.

At relatively low solids feed rates, laminar flows in the wash section exist as shown in FIG. 1, thereby providing many effective stages, i.e., liquid flow in all regions above the wash nozzles is vertically upward, and all solids movement is vertically downward, resulting in true countercurrent flow. There is a temperature interface and density gradient which form a heat transfer zone. Such a condition can be realized with solids flows in the order of 130 lbs/ft$^2$ (635 kg/m$^2$). As solids feed rates are increased, turbulent mixing occurs in regions above and below the temperature and density gradient, thereby reducing effective stages to two as shown in FIG. 2.

It has been calculated that by introducing up to about one-half of the wash solvent at intermediate points in the column and at appropriate temperatures intermediate between the temperatures at the top and bottom of the column the temperature gradient in the column can be reinforced and thereby increase the number of effective washing stages in the column.

The examples which follow have been calculated to show in more detail the several concepts of the invention.

EXAMPLE 1

Two Stages

A 50 wt. % slurry of polypropylene in liquid propylene diluent which has been previously treated with a chelating agent is introduced into the upper part of a polymer wash column at 160° F. (71° C.) at a rate of 18,000 kg/hr. The polymer contains 100 ppm, equivalent to 900 gm/hr., of titanium. Wash propylene free of catalyst components is introduced into the lower section of the column at a rate of 15,750 kg/hr and at a temperature of 55° F. (13° C.). Polymer discharged from the bottom of the column as a 50 wt. % slurry contains 9.6 ppm titanium and solvent removed from the top of the column at a rate of 15,750 kg/hr and essentially free of solid polymer contains 51.6 ppm or 813.6 gm/hr of titanium, corresponding to 90.4% titanium extraction. These conditions create two extraction stages in the column, the top stage having an average temperature of 134° F. (57° C.) and a specific gravity of 0.464, and the lower stage having an average temperature of 86° F. (30° C.) and a specific gravity of 0.514. The interface between the stages has a temperature gradient of 48° F. (27° C.) and a specific gravity gradient of about 0.050.

EXAMPLE 2

Three Stages

Polypropylene slurry identical to the feed for Example 1 is fed at a slurry rate of 18,000 kg/hr into the upper part of a polymer wash column. The same amount of wash propylene as used in Example 1, 15,750 kg/hr is split into two streams with 12,375 kg/hr cooled to 55° F. (13° C.) entering the wash column near the bottom and the remaining 3,375 kg/hr entering the column near the column mid-point at a temperature of 110° F. (43° C.). This procedure leads to the creation of three extraction stages in the column with the top stage at 145° F. (63° C.) and with a specific gravity of 0.450, the middle stage at 120° F. and a specific gravity of 0.48 and the bottom stage at 85° F. and a specific gravity of 0.515. Thus, the interface between the top stage and the middle stage has a temperature gradient of 25° F. (14° C.) and a specific gravity gradient of about 0.030 and the interface between the middle stage and the bottom stage has a temperature gradient of 35° F. (19° C.) and a specific gravity gradient of 0.035. With this three-stage extraction the polymer in the 50 wt. % slurry leaving the bottom of the column contains only 3.6 ppm titanium, and the solvent leaving the top of the column which is essentially free of solid polymer contains 55 ppm or 867.4 gm/hr of titanium, corresponding to an improved titanium extraction efficiency of 96.4%.

To further aid the reader, the following is given.

Operating conditions such as mass flow rates and temperature gradients, and physical properties of the system such as densities of the solids and solvent, viscosity of the solvent, particle size of the solids and the like can have a marked effect on the operation of a countercurrent solids extraction column.

The invention is applicable to washing solids which tend to form compressible beds when consolidated on a filter, thereby making efficient washing in this manner very difficult. It is also applicable where high pressures are required, because pressurized filters are difficult to seal.

Reasonable variation and modification are possible within the scope of the foregoing disclosure, drawings, and the appended claims to the invention the essence of which is that in a washing zone or column the washing fluid is introduced in at least two portions in a manner as herein described to create at least three extraction stages or zones within the operation.

What is claimed is:
1. A method for removing undesired components from a solid which consists essentially of introducing a slurry of solids into one end of a treating zone, moving said solid as a slurry through said treating zone countercurrently to a flowing treating agent introduced into said zone and moved through said zone characterized in that regions of turbulent mixing are formed separated by at least two temperature interfaces by introducing several portions of a treating agent to loci spaced at different distances away from said one end, a portion introduced farthest from the place of slurry introduction being at a substantially different temperature from that of the slurry and a portion of treating agent introduced intermediate the introduction of the slurry and the first introduced agent being at a temperature intermediate the temperature of the slurry and said first portion of introduced agent, the densities and temperatures of the solids and the treating agent being different and differing to an extent, rendering possible the countercurrent flow of the solids and the treating agent and the formation of regions of turbulent mixing separated by at least two temperatures interfaces.

2. A method according to claim 1 wherein a polyolefin solids slurry is washed with a solvent which is miscible with the solvent phase of said solids slurry.

3. A method according to claim 2 wherein the polyolefin is polypropylene and the solvent is liquid propylene.

4. A method according to claim 3 wherein the polypropylene is slurried in propylene.

5. A method according to claim 1 wherein the solid is heavier than the solvent so that the solids in the slurry tend to settle downwardly.

6. A method according to claim 5 wherein the temperature of the introduced slurry is higher than that of the portion of treating agent introduced farthest from the place of slurry introduction.

7. A method according to claim 1 where each portion of treating agent is at a temperature higher than the portion introduced below it, when the solid is of a density higher than that of the treating agent, and at a lower temperature when the solid is of a density lower than the treating agent and the lower density solid is introduced into a bottom portion of the treating zone.

8. A method for removing undesired components from a solid polyolefin which comprises introducing a slurry of polyolefin solids into one end of a treating zone, moving said solid as a slurry through said treating zone countercurrently to a flowing treating agent introduced into said zone and moved through said zone characterized in that several portions of a treating agent are introduced to loci spaced at different distances away from said one end, a portion introduced farthest from the place of slurry introduction being at a substantially different temperature from that of the slurry and a portion of treating agent introduced intermediate the introduction of the slurry and the first introduced agent being at a temperature intermediate the temperature of the slurry and said first portion of introduced agent, the densities and temperatures of the solids and the treating agent being different and differing to an extent, rendering possible the countercurrent flow of the solids and the treating agent and the formation of regions of turbulent mixing separated by at least two temperature interfaces.

* * * * *